United States Patent
Saito et al.

(10) Patent No.: US 10,689,743 B2
(45) Date of Patent: Jun. 23, 2020

(54) PISTON RING

(71) Applicants: IHI Corporation, Tokyo (JP); IHI POWER SYSTEMS CO., LTD., Tokyo (JP)

(72) Inventors: Yoshiyuki Saito, Tokyo (JP); Takeshi Yamada, Tokyo (JP); Yoshiyuki Umemoto, Tokyo (JP); Nobuaki Kato, Nagoya (JP); Hiroaki Mizuno, Ichinomiya (JP)

(73) Assignees: IHI CORPORATION (JP); IHI POWER SYSTEMS CO., LTD. (JP)

( * ) Notice: Subject to any disclaimer, the term of this patent is extended or adjusted under 35 U.S.C. 154(b) by 290 days.

(21) Appl. No.: 15/178,823

(22) Filed: Jun. 10, 2016

(65) Prior Publication Data

US 2016/0281202 A1  Sep. 29, 2016

Related U.S. Application Data

(63) Continuation of application No. 14/258,411, filed on Apr. 22, 2014, now abandoned, which is a (Continued)

(30) Foreign Application Priority Data

Oct. 25, 2011 (JP) .................. 2011-233998

(51) Int. Cl.
*C23C 4/10* (2016.01)
*C22C 29/08* (2006.01)
(Continued)

(52) U.S. Cl.
CPC ............... *C23C 4/10* (2013.01); *C22C 29/08* (2013.01); *C23C 4/06* (2013.01); *C23C 4/129* (2016.01); *F16J 9/26* (2013.01)

(58) Field of Classification Search
None
See application file for complete search history.

(56) References Cited

U.S. PATENT DOCUMENTS

| 3,071,489 A | 1/1963 | Pelton et al. ................ 428/564 |
| 4,515,763 A | 5/1985 | Boudart et al. .............. 423/409 |

(Continued)

FOREIGN PATENT DOCUMENTS

| CN | 1997474 A | 7/2007 |
| CN | 101644206 A | 2/2010 |

(Continued)

OTHER PUBLICATIONS

Machine Translation of JP 05-086452 (Year: 2018).*
(Continued)

*Primary Examiner* — Shamim Ahmed
*Assistant Examiner* — Bradford M Gates
(74) *Attorney, Agent, or Firm* — Ostrolenk Faber LLP

(57) ABSTRACT

A piston ring is provided with a thermal spray coating that contains tungsten carbide and chrome carbide as a hard phase, and contains nickel as a metallic binder phase, and is characterized in that the thermal spray coating is formed by the spraying of a thermal spray powder that has been produced by means of a granulation sintering method, and that contains hard particles in which the mean particle diameter of the tungsten carbide has been adjusted by means of a BET method to fall within a range of not less than 0.15 μm and not more than 0.45 μm.

5 Claims, 9 Drawing Sheets

Related U.S. Application Data continuation of application No. PCT/JP2012/077597, filed on Oct. 25, 2012.

(51) Int. Cl.
    *C23C 4/129*      (2016.01)
    *C23C 4/06*      (2016.01)
    *F16J 9/26*      (2006.01)

(56) References Cited

U.S. PATENT DOCUMENTS

| | | | |
|---|---|---|---|
| 6,482,534 B2 | 11/2002 | Itsukaichi et al. | 428/569 |
| 6,887,585 B2 | 5/2005 | Herbst-Dederichs | 428/546 |
| 2002/0136894 A1 | 9/2002 | Itsukaichi | 428/402 |
| 2004/0069141 A1 | 4/2004 | Herbst-Dederichs | 92/223 |
| 2006/0040125 A1* | 2/2006 | Obara | C23C 4/06 428/556 |
| 2007/0099027 A1* | 5/2007 | Krishnamurthy | B32B 15/01 428/698 |
| 2007/0099028 A1 | 5/2007 | Yamamoto et al. | 428/698 |
| 2008/0311306 A1 | 12/2008 | Xiao et al. | 427/453 |
| 2009/0022994 A1 | 1/2009 | Aminian et al. | 428/404 |
| 2010/0297432 A1 | 11/2010 | Sherman et al. | 428/325 |
| 2012/0186160 A1 | 7/2012 | Morisada | 51/307 |
| 2012/0306158 A1 | 12/2012 | Kennedy | 277/442 |

FOREIGN PATENT DOCUMENTS

| | | |
|---|---|---|
| CN | 101680073 A | 3/2010 |
| CN | 101715521 A | 5/2010 |
| CN | 102586713 | 7/2012 |
| DE | 10061749 A1 | 6/2002 |
| JP | 05-086452 | 4/1993 |
| JP | 2001-234320 | 8/2001 |
| JP | 2002-220652 | 8/2002 |
| JP | 2004-514795 | 5/2004 |
| JP | 2005-155711 | 6/2005 |
| JP | 2011-038143 | 2/2011 |
| WO | WO 2010/115448 A1 | 10/2010 |

OTHER PUBLICATIONS

Office Action dated Feb. 12, 2015 and Search Report in corresponding Chinese Patent Application No. 201280051055.4 (with English language translation)(12 pages).

Extended European Search Report and European Search Opinion dated Mar. 6, 2015 in corresponding European Patent Application No. 12844372.8 (5 pages).

Priidu Peetsalu, et al., "Characterization of WC-Co composite thermal spray powders and coatings," Proceedings of the Estonian Academy of Sciences, Engineering, International Baltic Conference on Engineering Materials and Tribology Baltmattrib, Oct. 5-6, 2006, vol. 12, No. 4, Dec. 2006, pp. 435-444, Estonian Academy Publishers, Tallinn [EE].

International Search Report and Written Opinion dated Nov. 27, 2012 in corresponding PCT International Application No. PCT/JP2012/077597.

\* cited by examiner

U-1 WC($\phi$0.60$\mu$m)/20CrC/7Ni

U-31 WC($\phi$0.30$\mu$m)/20CrC/7Ni

U-11 WC($\phi$0.15$\mu$m)/20CrC/7Ni

U-42 WC(φ0.45μm)/20CrC/7Ni

U-41 WC(φ0.1μm)/20CrC/7Ni

PISTON RING

This application is a continuation of U.S. patent application Ser. No. 14/258,411, filed Apr. 22, 2014, which is a continuation application based on a PCT Patent Application No. PCT/JP2012/077597, filed Oct. 25, 2012, whose priority is claimed on Japanese Patent Application No. 2011-233998, filed Oct. 25, 2011. The contents of both the PCT application and the Japanese Patent Application are incorporated herein by reference.

TECHNICAL FIELD

The present invention relates to a piston ring, and particularly to a piston ring that is provided with a thermal spray coating.

BACKGROUND ART

Generally, the piston rings that are provided in an internal combustion engine such as a diesel engine have an anti-seize protective coating provided on a sliding surface thereof that slides against the cylinder liner. Conventionally, multi-layer chrome plating has been commonly used for this protective coating, however, in recent years, due to changes in the sliding environment of the piston rings of internal combustion engines, instances in which seizures have occurred in the actual machinery even while the multi-layer chrome plating forming the protective coating is still extant are being seen more and more often. It is thought that this is due to the fact that, while multi-layer chrome plating makes it possible for a uniform coating to be formed, it is difficult for microscopic seizure portions in the coating to drop off, with the result that there is a tendency for a seizure to spread suddenly over a wide area.

In Patent document 1 (see below), a piston ring that is provided with a thermal spray coating (i.e., a cermet thermal spray coating) instead of multi-layer chrome plating as a protective coating is disclosed. This thermal spray coating has a hard phase formed from hard particles of tungsten carbide (WC) and chromium carbide ($Cr_3C_2$) and the like, and a metallic binder phase that is formed from molybdenum (Mo), cobalt (Co), nickel (Ni), and chrome (Cr). It is easier for microscopic portions of the coating to fall of in this thermal spray coating than in multi-layer chrome plating, so that a thermal spray coating has superior seizure resistance.

DOCUMENT OF RELATED ART

Patent Documents

[Patent Document 1] Japanese Patent Application Laid-Open (JP-A) No. 2005-155711

SUMMARY OF INVENTION

Technical Problem

However, although this thermal spray coating has excellent seizure resistance, its hardness and brittleness make it easier for cracks to occur in it. Moreover, thermal spray coating has inferior workability compared to multi-layer chrome plating so that the problem arises that it is difficult to use in practical applications, and at the actual level of real machinery there are hardly any applications in which it actually used.

The present invention was conceived in view of the above-described problems and it is an object thereof to provide a piston ring that is provided with a thermal spray coating that has superior seizure resistance compared to multi-layer chrome plating and also has equivalent or superior workability compared to multi-layer chrome plating.

Solution to Problem

The inventors of the present application performed repeated exhaustive experiments in order to solve the above-described problems. As a result, they discovered that, by adjusting the mean particle diameter of predetermined hard particles contained in the thermal spray powder to within a predetermined range, it was possible to form a thermal spray coating that was provided with both seizure resistance and workability. As a consequence of this, the present invention was attained.

Namely, in order to solve the above-described problems, according to a first aspect of the present invention, a piston ring is employed that is provided with a thermal spray coating that contains tungsten carbide and chrome carbide as a hard phase, and contains nickel as a metallic binder phase, and in which the thermal spray coating is formed by the spraying of a thermal spray powder that has been produced by means of a granulation sintering method, and that contains hard particles in which the mean particle diameter of the tungsten carbide has been adjusted by means of a BET method to fall within a range of not less than 0.15 µm and not more than 0.45 µm.

According to a second aspect of the present invention, in the above-described first aspect a structure is employed in which the thermal spray coating contains nickel within a range of not less than 7.0 wt % and not more than 18.5 wt % as a metallic binder phase.

According to a third aspect of the present invention, in the above-described first or second aspects a structure is employed in which the thermal spray coating has a composition that contains 7.0 wt % of nickel as the metallic binder phase, and 20 wt % of chromium carbide as the hard phase, and in which the remainder is made up of tungsten carbide as a hard phase and inevitable impurities.

According to a fourth aspect of the present invention, in the above-described first or second aspects a structure is employed in which the thermal spray coating has a composition that contains 12.5 wt % of nickel as the metallic binder phase, and 37.5 wt % of chromium carbide as the hard phase, and in which the remainder is made up of tungsten carbide as a hard phase and inevitable impurities.

According to a fifth aspect of the present invention, in the above-described first aspect a structure is employed in which the porosity of the thermal spray coating is 3% or less.

According to a sixth aspect of the present invention, in the above-described first aspect a structure is employed in which the thermal spray coating is formed by spraying using a high-speed frame spraying method.

Effects of the Invention

According to the present invention, it is possible to obtain a piston ring that is provided with a thermal spray coating that has superior seizure resistance compared to multi-layer chrome plating and also has equivalent or superior workability compared to multi-layer chrome plating.

DESCRIPTION OF EMBODIMENTS

Embodiments of the present invention will now be described with reference made to the drawings.

Figure 1:
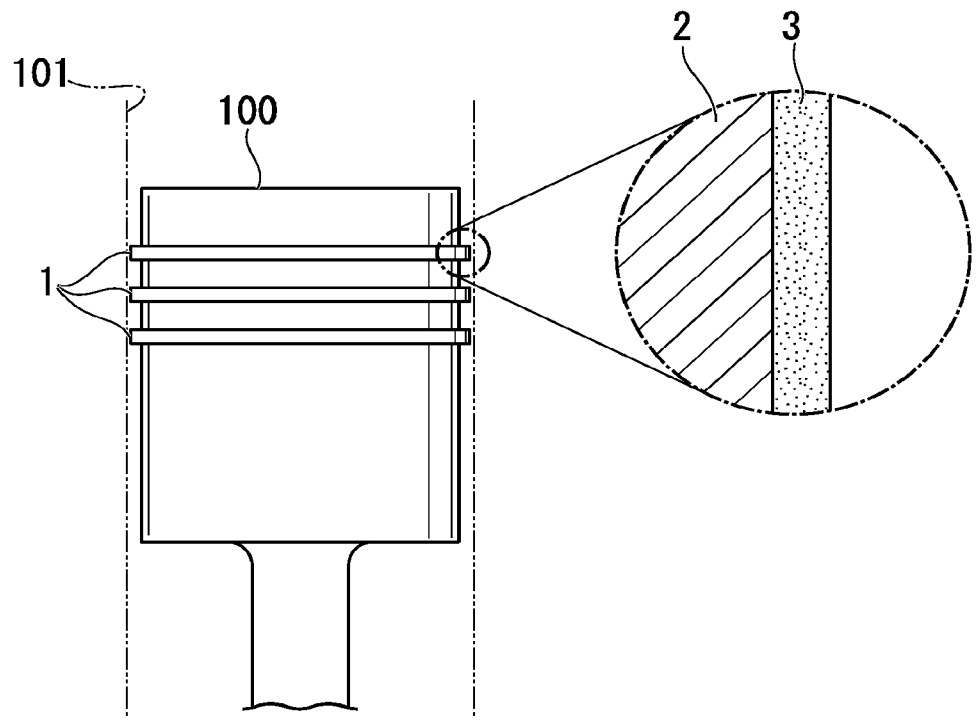
FIG. 1 is a schematic view showing the structure of a piston ring according to an embodiment of the present invention.

FIG. 1 is a schematic structural view showing the structure of a piston ring 1 according to an embodiment of the present invention.

The piston ring 1 of the present embodiment is provided in a piston 100 of an internal combustion engine such as a diesel engine or the like. The piston 100 is constructed such that it is able to slide inside a cylinder liner 101, and the piston ring 1 has a thermal spray coating 3 provided on a sliding surface thereof that serves as a protective coating for a base material 2.

The thermal spray coating 3 contains tungsten carbide (WC) and chrome carbide ($Cr_3C_2$) as a hard phase, and contains nickel (Ni) as a metallic binder phase. This thermal spray coating 3 is formed by the spraying of a thermal spray powder that has been produced by means of a granulation sintering method, and that contains hard particles in which the mean particle diameter of the tungsten carbide has been adjusted to fall within a range of not less than 0.15 μm and not more than 0.45 μm.

The preparation of a thermal spray coating by means of a granulation sintering method is performed in the following manner. Firstly, tungsten carbide powder that has been adjusted such that it lies within the above-described predetermined range is added to a dispersion medium so as to create a slurry. At this time, it is also possible for a suitable organic binder or inorganic binder to be added to the slurry. Next, using a spray granulator, granules are created from the slurry, and these granules are then sintered. The sintered granules are then cracked and classified. As a result, it is possible to manufacture a thermal spray powder by means of a granulation sintering method that contains hard particles in which the mean particle diameter of the tungsten carbide has been adjusted to fall within the above-described range.

To measure the mean particle diameter of the tungsten carbide raw material (i.e., primary particles), equivalent values obtained using the following formula from specific surface areas that are determined by means of a BET (Brunauer, Emmet and Teller's equation) method using a Monosorb Automatic Specific Surface Area Analyzer manufactured by Quantachrome Instruments Ltd were used.

$$D=6/(\rho S)$$

Here, D represents the mean particle diameter (μm), ρ represents the theoretical density of WC (15.7 (g/cm$^3$)), and S represents the specific surface area (m$^2$/g) measured using a BET method. Namely, the mean particle diameter D is determined by assuming that the particles are spherical, and then calculating their diameters using the specific surface area of the powder determined by the BET method. Note that the gas used for this BET calculation is $N_2$–70 vol % He.

Accordingly, strictly speaking, the aforementioned adjustment of the mean particle diameter of the tungsten carbide such that this falls within a range of not less than 0.15 μm and not more than 0.45 μm refers to an adjustment to within a range of not less than 0.15 μm and not more than 0.45 μm using mean particle diameters measured via the BET method. In the same way, the mean particle diameters described below are also mean particle diameters determined via the BET method.

The thermal spray coating 3 of the present embodiment is formed by, for example, spraying a thermal spray powder that contains hard particles in which the mean particle diameter of the tungsten carbide has been adjusted to 0.15 μm.

Tungsten carbide (WC) has sufficient hardness for it not to be abraded by the hard particles contained in the fuel oil of a diesel engine, and is able to limit the abrasion wear that is caused by these hard particles in the fuel oil, and also provide improved seizure resistance. However, if the mean particle diameter of the tungsten carbide exceeds 0.45 μm, the hardness and brittleness of the tungsten carbide make it easy for cracks to appear in the thermal spray coating 3, and the workability thereof is inferior compared to multi-layer chrome plating. On the other hand, from the standpoint of workability, the smaller the mean particle diameter of the tungsten carbide the better, however, if this mean particle diameter is less than 0.15 μm, there is a possibility that the abrasion resistance will deteriorate. Accordingly, it is preferable for the mean particle diameter of the tungsten carbide to be within a range of not less than 0.15 μm and not more than 0.45 μm.

It is also preferable for the thermal spray coating 3 to contain nickel (Ni) within a range of not less than 7.0 wt % and not more than 18.5 wt % as a metallic binder phase. Because the metal strength of nickel is not too high, and nickel makes it easier for microscopic drop-offs in the coating to occur, it is possible to obtain improved seizure resistance. However, if the nickel exceeds 18.5 wt %, conversely, it becomes more difficult for drop-offs to be appropriately generated in the coating, and there is inferior seizure resistance compared to multi-layer chrome plating.

On the other hand, if the nickel is less than 7.0 wt %, its effectiveness as a binder is diminished.

It is preferable for the thermal spray coating 3 to have a composition that contains, in particular, 7.0 wt % of nickel as a metallic binder phase, and 20 wt % of chromium carbide as a hard phase, and in which the remainder is made up of tungsten carbide as a hard phase and inevitable impurities.

Moreover, it is preferable for the thermal spray coating 3 to have a composition that contains, in particular, 12.5 wt % of nickel as a metallic binder phase, and 37.5 wt % of chromium carbide as a hard phase, and in which the remainder is made up of tungsten carbide as a hard phase and inevitable impurities.

Moreover, it is preferable for the thermal spray coating 3 to have a composition that contains, in particular, 18.5 wt % of nickel as a metallic binder phase, and 17.5 wt % of chromium carbide as a hard phase, and in which the remainder is made up of tungsten carbide as a hard phase and inevitable impurities.

In this manner, by increasing the proportion of the hard phase that is formed by tungsten carbide (WC) having a small mean particle diameter, it is possible to form a thermal spray coating 3 that has a low porosity, is smooth, and has precise dimensions.

It is preferable for the porosity of the thermal spray coating 3 to be 3% or less. If the porosity exceeds 3%, then a number of large air holes are formed so that the oil film forming ability deteriorates, and the lifespan of the coating is shortened. Note that the porosity referred to here is determined by measuring the coating cross-section of the thermal spray coating 3 after mirror polishing, or by measuring the cross-section of the sintered body using an image analyzing method. Specifically, in the present embodiment, Image-Pro (manufactured by Media Cybernetics) is used for the image analysis software.

The thermal spray method also has an effect on the porosity of the thermal spray coating 3. Accordingly, when forming the thermal spray coating 3, it is preferable to employ a high-speed frame spraying method in order to form a precise and smooth coating with low porosity. A HVOF (High Velocity Oxy Fuel) thermal spray method or a HVAF (High Velocity Air Fuel) thermal spray method or the like may be considered for the high-speed frame spraying method. In the present embodiment, a HVOF thermal spray method is used.

The piston ring 1 of the above-described present embodiment is provided with the thermal spray coating 3 that has excellent oil film forming capabilities, and has sufficient hardness for it not to be abraded by the hard particles contained in the fuel oil of a diesel engine, and that makes it easy for microscopic drop-offs in the coating to occur. Specifically, because the thermal spray coating 3 has low porosity and is a highly precise, smooth coating, and, additionally, has a high proportion of hard particles (WC, $Cr_3C_2$), and has an appropriate quantity of drop-offs due to the fact that the strength of the binder metal (Ni) is not too great, by reducing the mean particle diameter of the hard particles (WC), it is possible to obtain a thermal spray coating that has superior seizure resistance compared to multi-layer chrome plating and has the equivalent or better workability than multi-layer chrome plating.

EXAMPLES

Hereinafter, effects of the present invention will be described using examples. Note that the present invention is not limited to these examples and various modifications may be made thereto insofar as they do not depart from the spirit or scope of the present invention.

Firstly, a plurality of test specimens were prepared using high-speed frame thermal spray coating. The spray conditions during the preparation of these test specimens were as follows.

Sprayer: High-speed frame thermal sprayer JP-5000 (manufactured by Praxair/TAFA)
Oxygen flow rate: 1900 scfh (893 l/min)
Kerosene flow rate: 5.1 gph (0.32 l/min)
Thermal spray distance: 380 mm
Barrel length: 4 inches (approximately 100 mm)
Powder supply rate: Approximately 80 g/min Next, a seizure resistance evaluation test and a workability evaluation test were performed on the prepared test specimens.

Figure 2:
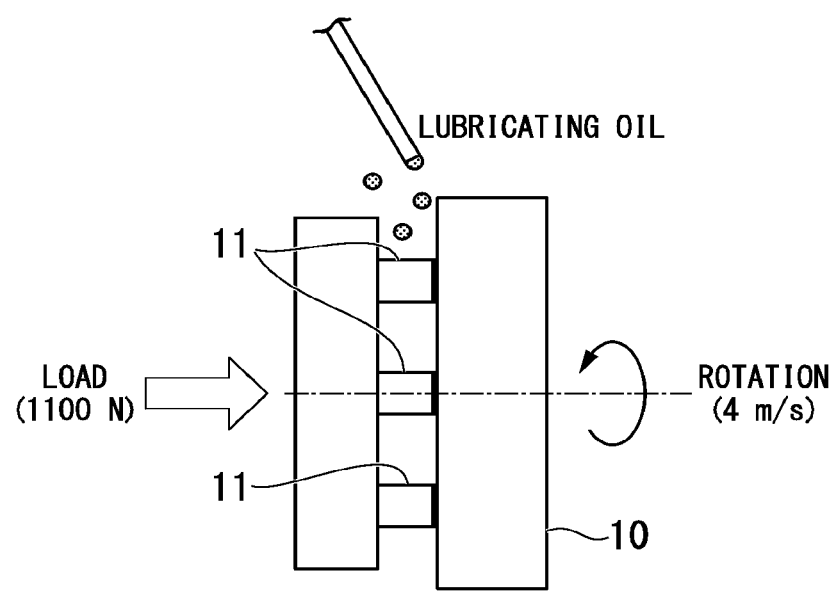
FIG. 2 is a view illustrating a seizure resistance evaluation test according to an embodiment of the present invention.
Figure 3A:
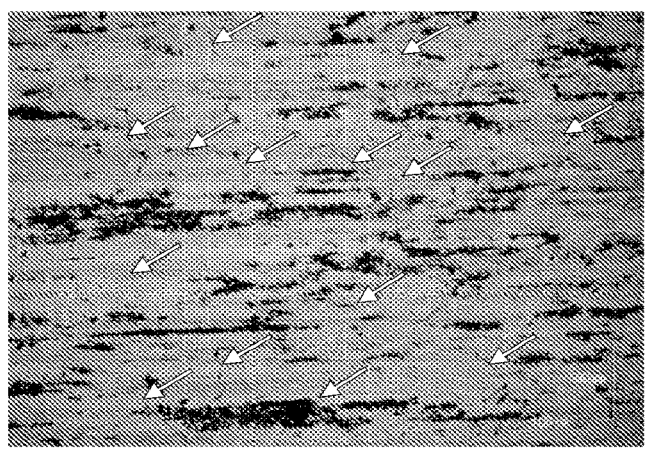
FIG. 3A is a view illustrating the state of a work surface of a test specimen after a workability evaluation test according to an embodiment of the present invention.
Figure 3B:
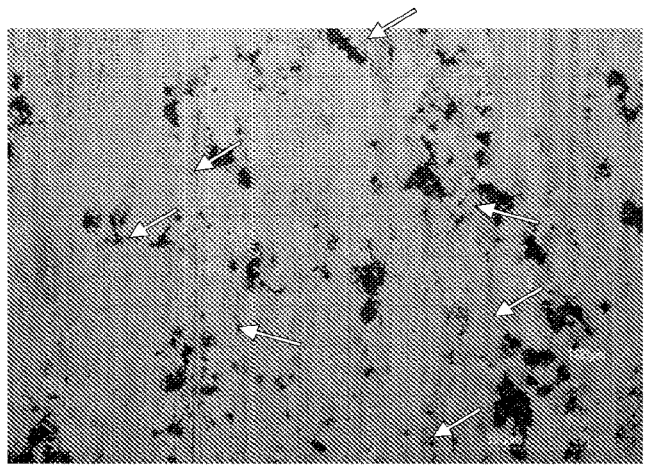
FIG. 3B is a view illustrating the state of a work surface of a test specimen after a workability evaluation test according to an embodiment of the present invention.
Figure 3C:
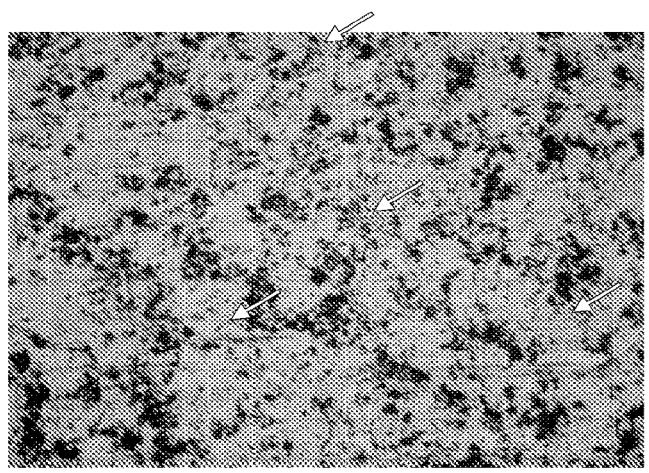
FIG. 3C is a view illustrating the state of a work surface of a test specimen after a workability evaluation test according to an embodiment of the present invention.
Figure 4A:
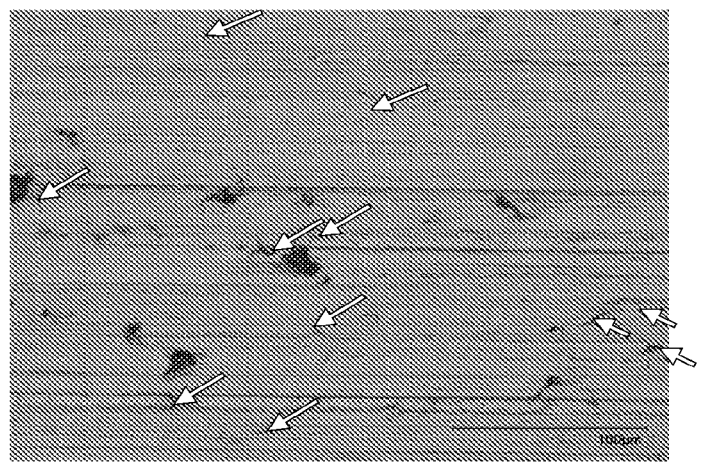
FIG. 4A is a view illustrating the state of a work surface of a test specimen after a workability evaluation test according to an embodiment of the present invention.
Figure 4B:
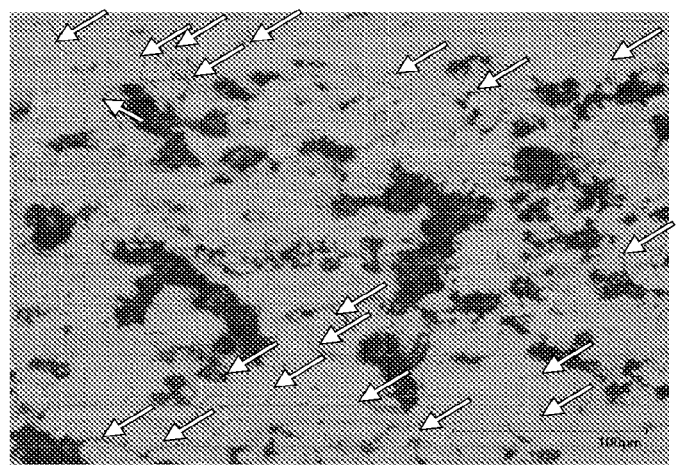
FIG. 4B is a view illustrating the state of a work surface of a test specimen after a workability evaluation test according to an embodiment of the present invention.

The seizure resistance evaluation test was performed in the manner shown in FIG. 2. The length of the sintering time was measured and the seizure resistance was subsequently evaluated.

The seizure resistance evaluation test was performed as follows. As shown in FIG. 2, the thermal spray coating side of a test specimen in the form of a ring material 11 was pressed under a predetermined load against a liner material 10, and the liner material 10 was then rotated. Initially, lubricating oil was supplied between the ring material 11 and the liner material 10, however, once the ring material 11 had reached a predetermined load via a plurality of stages, the supply of lubricating oil was stopped and the sintering time caused by the resulting absence of oil was measured.

The workability evaluation test was conducted by performing grinding processing to a predetermined depth on a prepared thermal spray coating. The crack length per unit area generated by this processing was then measured, and the workability was subsequently evaluated.

FIGS. 3A through 3C and FIGS. 4A and 4B show the state of a worked surface of a test specimen after the workability evaluation test according to an embodiment of the present invention. The cracks generated by this processing are shown by the arrows in FIGS. 3A through 3C and FIGS. 4A and 4B. Note that FIGS. 3A through 3C and FIGS. 4A and 4B show the state of the worked surface of each test specimen when the cutting depth of each cut was set at 0.002 mm (FIGS. 3A through 3C and FIGS. 4A and 4B).

Figure 5:
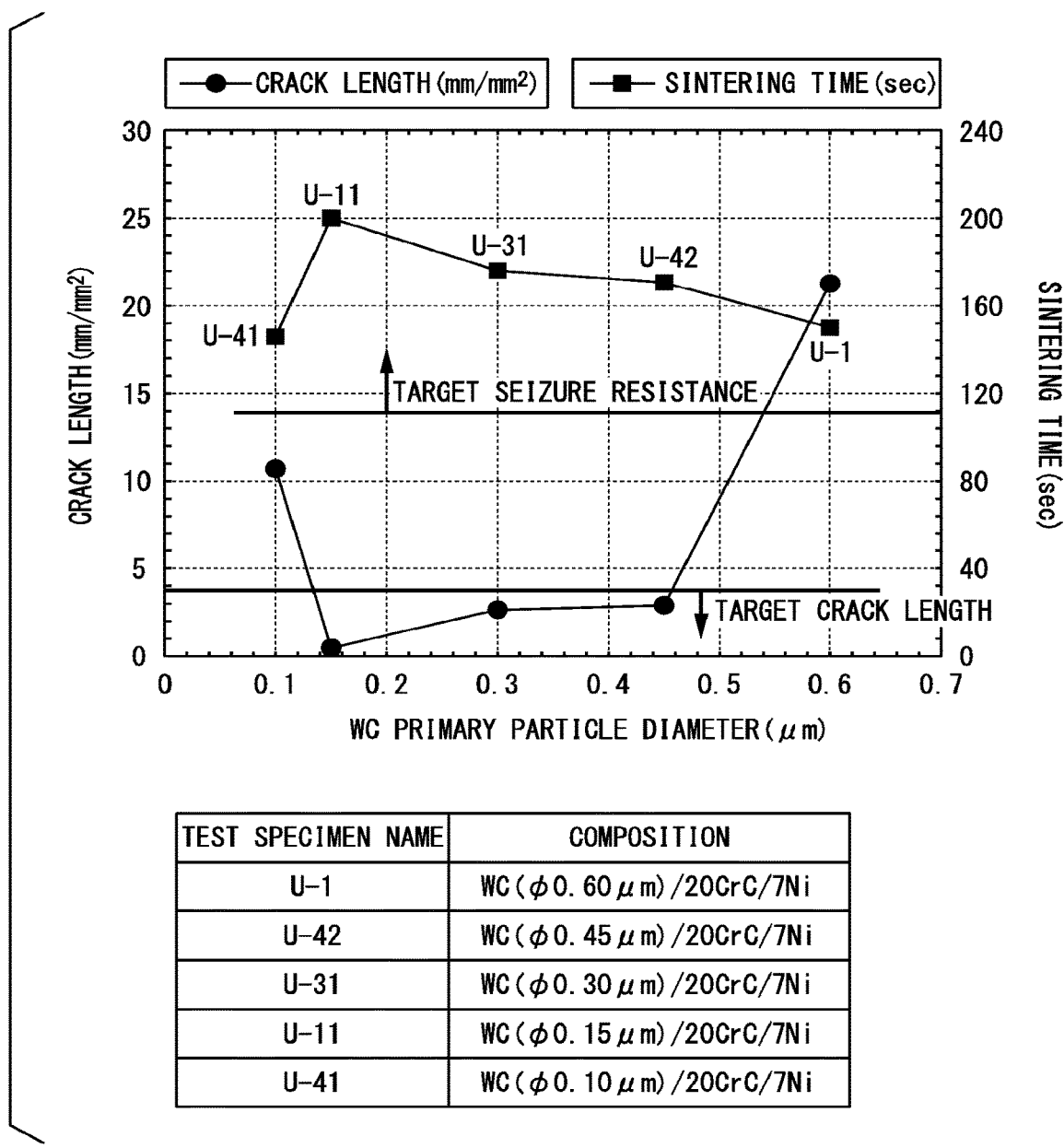
FIG. 5 is a graph showing a relationship between the mean particle diameter of tungsten carbide, a crack length, and a sintering time according to an embodiment of the present invention.
Figure 6:
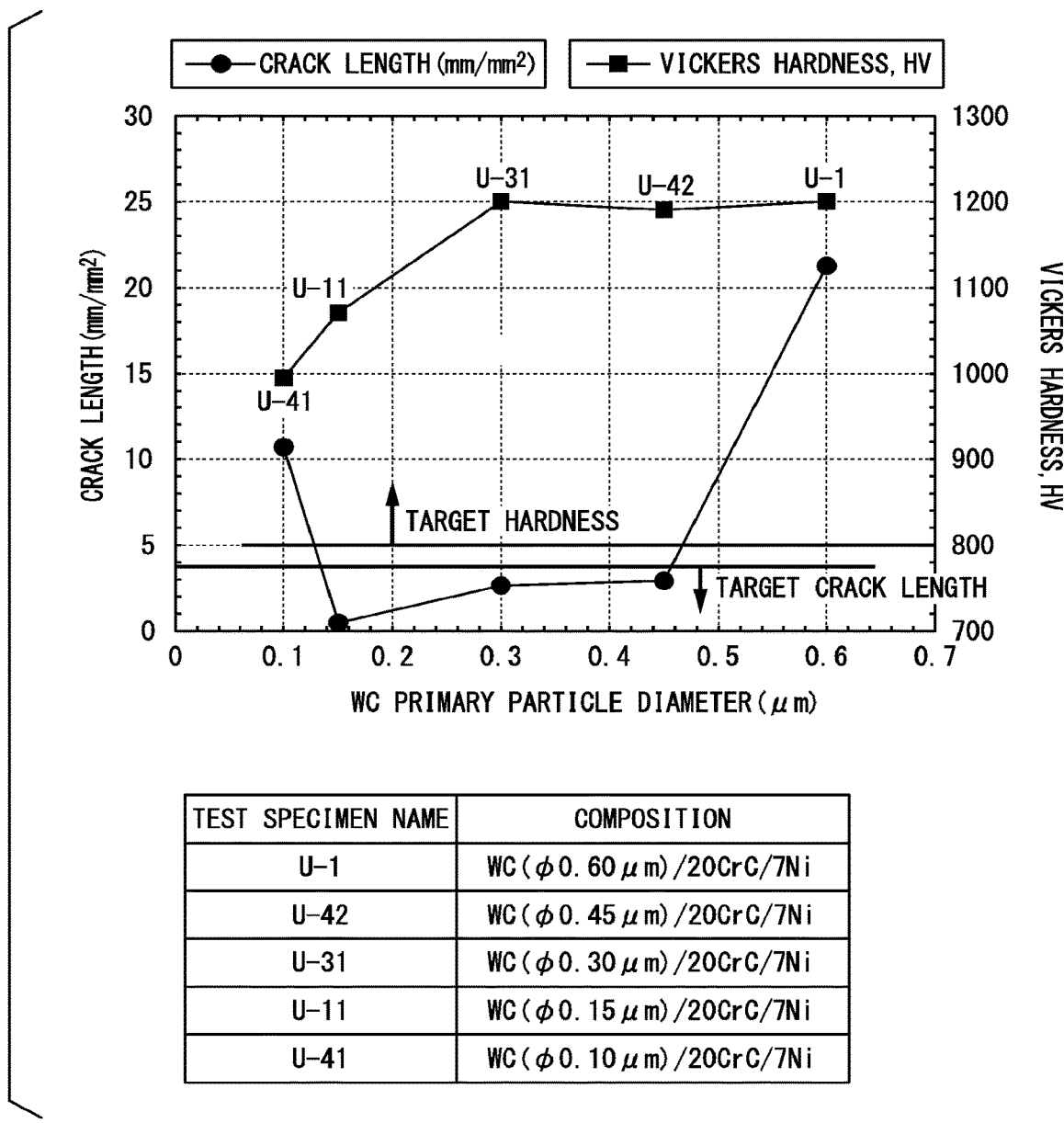
FIG. 6 is a graph showing a relationship between the mean particle diameter of tungsten carbide, a crack length, and a Vickers hardness according to an embodiment of the present invention.

FIG. 5 is a graph showing a relationship between the mean particle diameter of the tungsten carbide, the crack length, and the sintering time according to an embodiment of the present invention. FIG. 6 is a graph showing a relationship between the mean particle diameter of the tungsten carbide, the crack length, and the Vickers hardness according to an embodiment of the present invention. Note that the respective target values shown in the drawing represent those of a multi-layer chrome plating which serves as a conventional protective film.

As shown in FIG. 5, it was found that when the composition of the test specimens (U-1, U-42, U-31, U-11, and U-41) was the same, the smaller the mean particle diameter ($\phi$) of the tungsten carbide (WC), the better the seizure resistance until a mean particle diameter ($\phi$) of 0.15 μm was reached. It was also found that the seizure resistance was better than that of multi-lab chrome plating in each of the test specimen U-41 in which the mean particle diameter of the tungsten carbide (WC) was 0.1 μm, the test specimen U-11 in which it was 0.15 μm, the test specimen U-31 in which it was 0.30 μm, the test specimen unit U-42 in which it was 0.45 μm, and the test specimen U-1 in which it was 0.60 μm.

Moreover, it was also found that when the composition of the test specimens was the same, the smaller the mean particle diameter (φ) of the tungsten carbide (WC), the shorter the cracks generated per unit area and the better the workability until a mean particle diameter (φ) of 0.15 μm was reached. In contrast, when the mean particle diameter (φ) of the tungsten carbide (WC) was either less than 0.15 μm or exceeded 0.45 μm, it was found that the crack length became drastically longer and the workability was inferior compared to that of multi-layer chrome plating (see test specimen U-1 and test specimen U-41).

Note that as shown in FIG. 6, it was also found that when the composition of the test specimens was the same, then the smaller the mean particle diameter (φ) of the tungsten carbide (WC), the lower the hardness of the test specimen (see test specimen U-41). In addition, it was also found that the hardness of each of the test specimen U-1, the test specimen U-42, the test specimen U-31, the test specimen U-11, and the test specimen U-41 was superior compared to that of multi-layer chrome plating.

Figure 7:
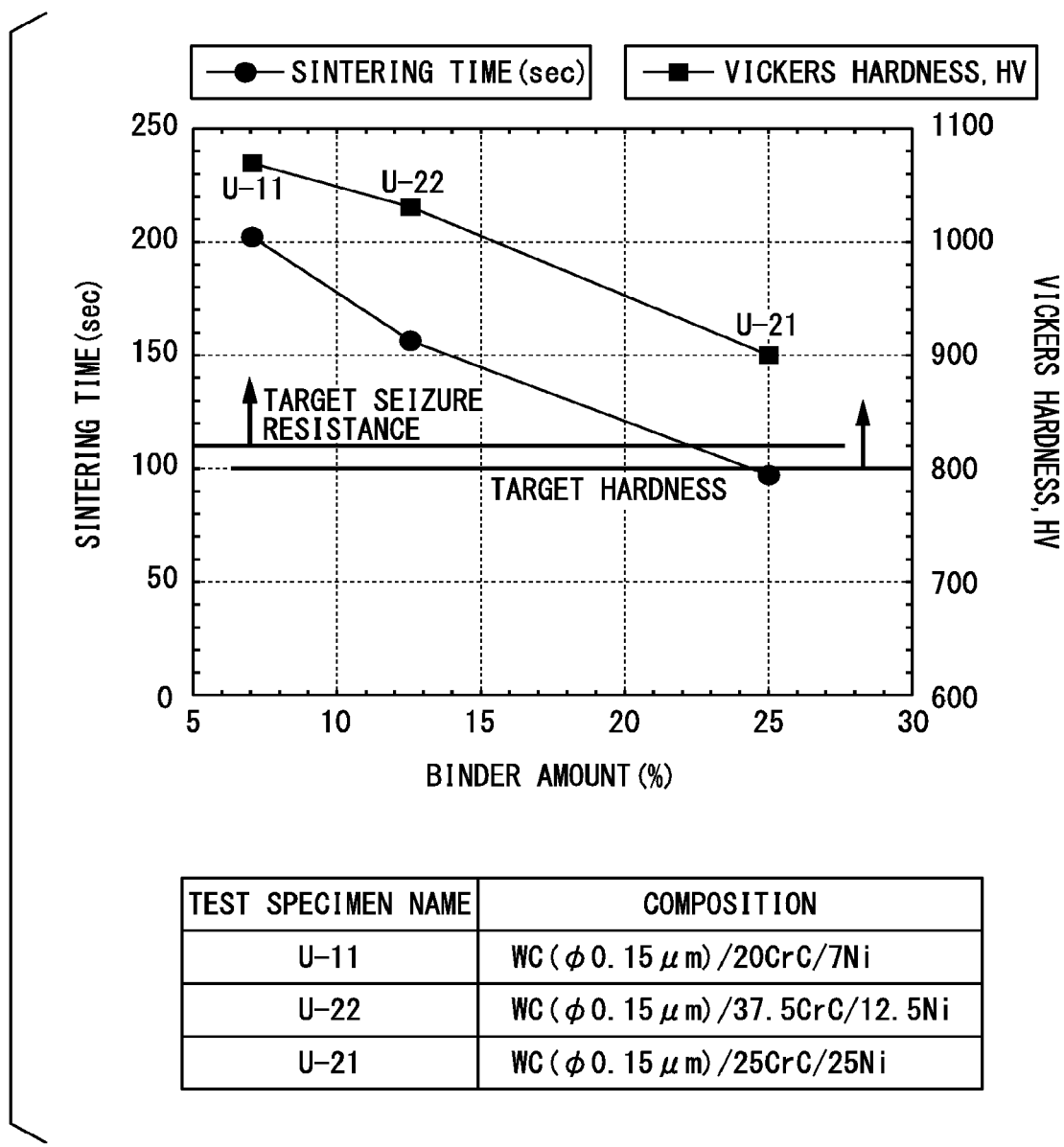
FIG. 7 is a graph showing a relationship between a nickel binder amount, a sintering time, and a Vickers hardness according to an embodiment of the present invention.
Figure 8:
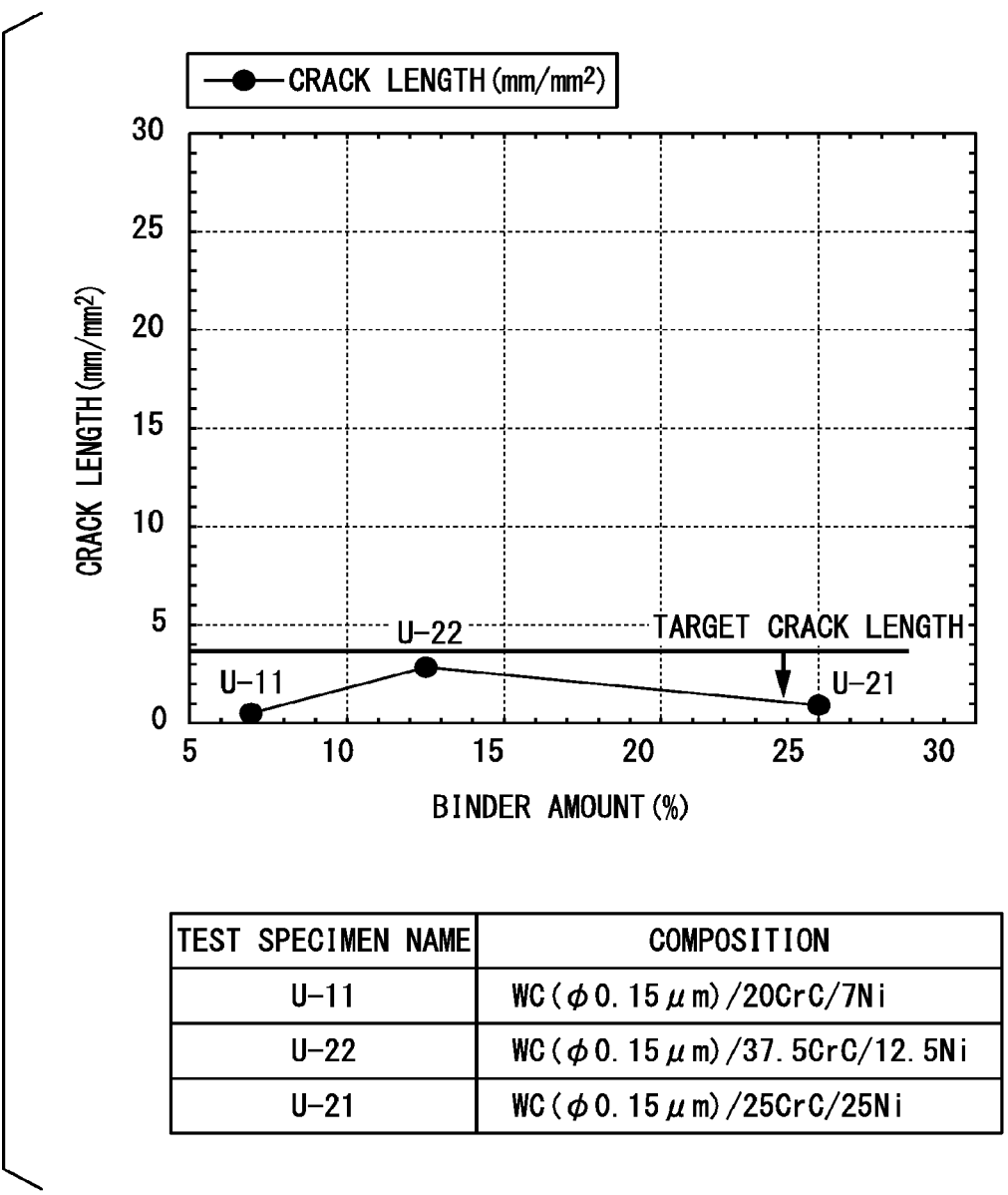
FIG. 8 is a graph showing a relationship between a nickel binder amount and a crack length according to an embodiment of the present invention.

FIG. 7 is a graph showing a relationship between the amount of nickel binder, the sintering time, and the hardness according to an embodiment of the present invention. FIG. 8 is a graph showing a relationship between the amount of nickel binder and the crack length according to an embodiment of the present invention. Note that, in the same way as described above, the respective target values shown in the drawing represent those of multi-layer chrome plating which serves as a conventional protective film.

As shown in FIG. 7, it was found that when the mean particle diameter (φ) of the tungsten carbide (WC) of the test specimens (U-11, U-22 and U-21) was the same, then the smaller the amount (wt %) of nickel (Ni) binder, which was serving as a metallic binder phase, the better the seizure resistance. In contrast, it was also found that if the amount of nickel (Ni) binder exceeded 12.5 wt %, then the sintering time became drastically shorter, and the seizure resistance was inferior compared to that of multi-layer chrome plating (see test specimen U-21).

Moreover, it was also found that when the mean particle diameter (φ) of the tungsten carbide (WC) was the same, then the smaller the amount of nickel (Ni) binder serving as a metallic binder phase, the better the hardness. It was also found that the hardness was superior to that of multi-layer chrome plating in each of the test specimen U-11, the test specimen U-22, and the test specimen U-21.

Note that, as shown in FIG. 8, it was also found that when the mean particle diameter (φ) of the tungsten carbide (WC) was the same, then the workability was superior to that of multi-layer chrome plating in each of the test specimen U-11, the test specimen U-22, and the test specimen U-21.

Figure 9:
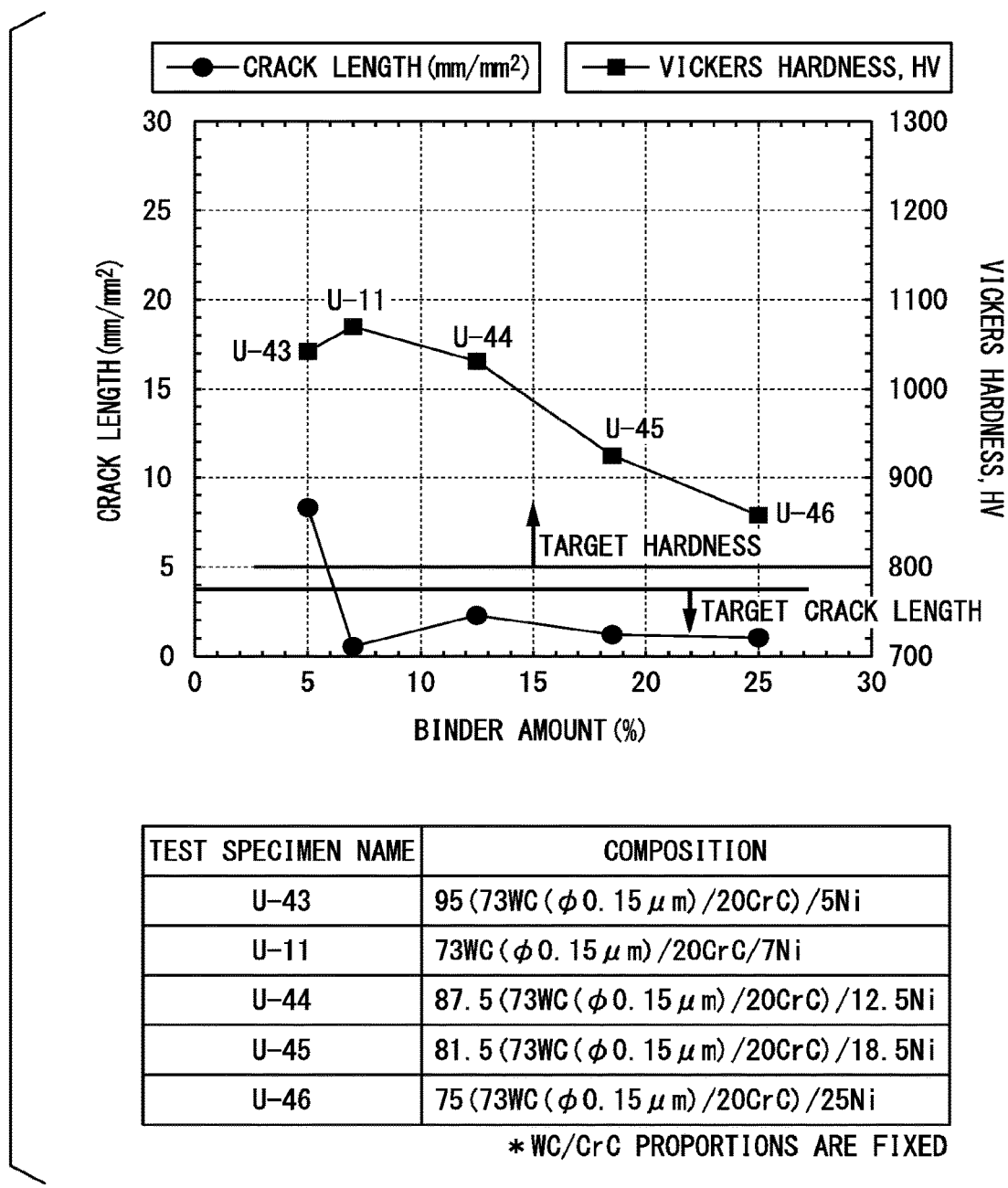
FIG. 9 is a graph showing a relationship between a nickel binder amount, a crack length, and a sintering time according to an embodiment of the present invention.
Figure 10:
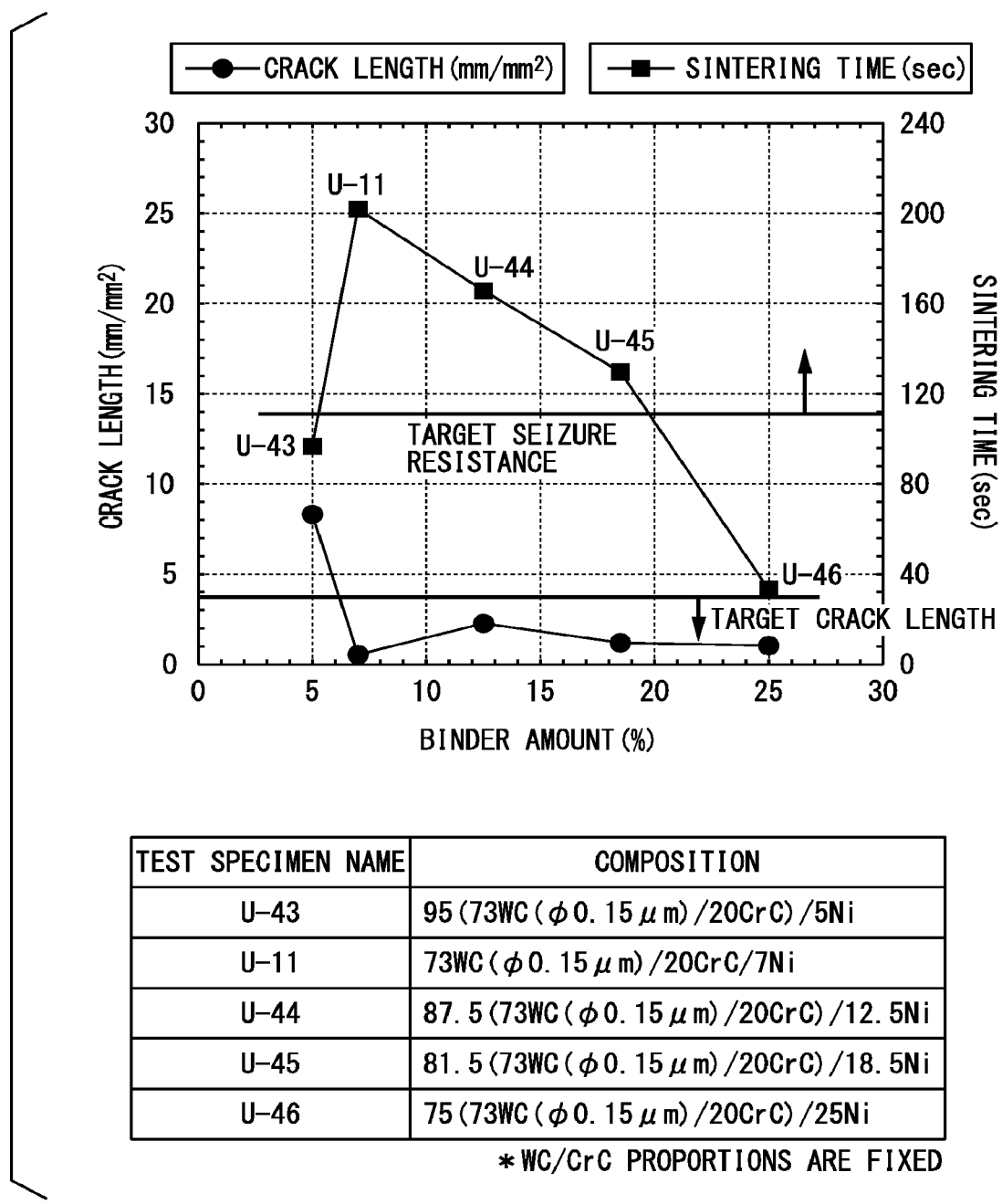
FIG. 10 is a graph showing a relationship between a nickel binder amount, a crack length, and a Vickers hardness according to an embodiment of the present invention.

FIG. 9 is a graph showing a relationship between the amount of nickel binder, the crack length, and the sintering time according to an embodiment of the present invention. FIG. 10 is a graph showing a relationship between the amount of nickel binder, the crack length, and the Vickers hardness according to an embodiment of the present invention. Note that, in the same way as described above, the respective target values shown in the drawing represent those of multi-layer chrome plating which serves as a conventional protective film.

As shown in FIG. 9, it was found that when the mean particle diameter (φ) of the tungsten carbide (WC) of the test specimens (U-43, U-11, U-44, U-45, and U-46) was the same and the blend proportion of the tungsten carbide (WC) and chromium carbide (CrC) was also the same, then the smaller the amount of nickel (Ni) binder serving as a metallic binder phase, the better the hardness until a binder amount of 7 wt % was reached. It was also found that the hardness was superior to that of multi-layer chrome plating in each of the test specimen U-43, the test specimen U-11, the test specimen U-44, the test specimen U-45, and the test specimen U-46.

Moreover, as shown in FIG. 10, it was found that when the mean particle diameter (φ) of the tungsten carbide (WC) of the test specimens was the same and the blend proportion of the tungsten carbide (WC) and chromium carbide (CrC) was also the same, then the smaller the amount of nickel (Ni) binder serving as a metallic binder phase, the better the seizure resistance until a binder amount of 7 wt % was reached. In contrast, it was also found that if the amount of nickel (Ni) binder was less than 7 wt % or greater than 18.5 wt %, then the sintering time became drastically shorter, and the seizure resistance was inferior compared to that of multi-layer chrome plating (see test specimen U-43 and test specimen U-46).

Moreover, as shown in FIG. 9 and FIG. 10, it was found that when the mean particle diameter (φ) of the tungsten carbide (WC) of the test specimens was the same and the blend proportion of the tungsten carbide (WC) and chromium carbide (CrC) was also the same, then if the amount of nickel (Ni) binder was less than 7 wt %, the crack length became drastically longer and the workability was inferior compared to that of multi-layer chrome plating (see test specimen U-43).

From the above-described results, it was determined that it was preferable for the mean particle diameter of the tungsten carbide to be adjusted so as to be within a range of not less than 0.15 μm and not more than 0.45 μm, and that it was also preferable for nickel to be included as a metallic phase binder within a range of not less than 7.0 wt % and not more than 18.5 wt %. Accordingly, a piston ring 1 that is provided with this type of thermal spray coating 3 has superior seizure resistance compared to multi-layer chrome plating, and has equivalent or superior workability compared to multi-layer chrome plating.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

For example, the present invention can be applied not only to piston rings in diesel engines, but also to piston rings in other types of internal combustion engine.

INDUSTRIAL APPLICABILITY

The present invention relates to a piston ring and can be used, in particular, on a piston ring that is provided with a thermal spray coating.

DESCRIPTION OF REFERENCE SIGNS

1 . . . Piston ring
2 . . . Base material
3 . . . Thermal spray coating
10 . . . Liner material
11 . . . Ring material
100 . . . Piston
101 . . . Cylinder liner

The invention claimed is:

1. A method of coating a piston ring comprising:
   manufacturing a thermal spray powder by adding tungsten carbide, chromium carbide, and nickel to a dispersion medium so as to create a slurry, creating granules from the slurry, sintering the granules, cracking the granules, and classifying the granules, the thermal spray powder containing nickel within a range of not less than 7.0 wt % and not more than 18.5 wt % and tungsten carbide particles of which mean particle diameter is in a range of not less than 0.15 μm and not more than 0.45 μm, and
   thermal spraying the thermal spray powder to the piston ring to form the thermal spray coating on the piston ring,
   wherein the method of coating the piston ring includes no step of forming a member on a surface of the thermal spray coating opposite to a surface of the thermal spray coating in contact with the piston ring.

2. The method of coating the piston ring according to claim 1, wherein the thermal spray coating has a composition that contains 7.0 wt % of nickel, 20 wt % of chromium carbide, and the remainder is made up of tungsten carbide and impurities.

3. The method of coating the piston ring according to claim 1, wherein the thermal spray coating has a composition that contains 12.5 wt % of nickel, and 37.5 wt % of chromium carbide, and the remainder is made up of tungsten carbide and impurities.

4. The method of coating the piston ring according to claim 1, wherein a porosity of the thermal spray coating is 3% or less.

5. The method of coating the piston ring according to claim 1, wherein the thermal spray coating is formed by spraying using a high-speed flame spraying method.

* * * * *